Figure 1:
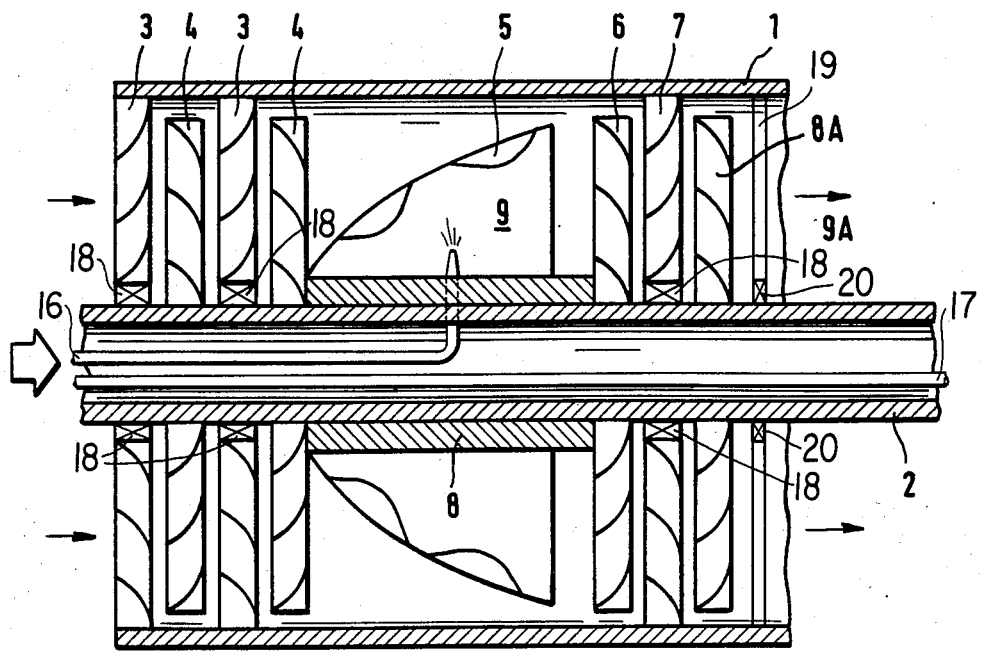

United States Patent [19]

García Cascajosa

[11] Patent Number: 4,707,978

[45] Date of Patent: Nov. 24, 1987

[54] FLOW ENERGY CONVERSION MACHINE

[75] Inventor: Felix García Cascajosa, Madrid, Spain

[73] Assignee: Latimer N.V., Curacao, Netherlands Antilles

[21] Appl. No.: 16,501

[22] Filed: Feb. 17, 1987

Related U.S. Application Data

[63] Continuation of Ser. No. 757,734, Jul. 22, 1985, abandoned.

[30] Foreign Application Priority Data

Sep. 5, 1984 [DE] Fed. Rep. of Germany ....... 3432683

[51] Int. Cl.$^4$ .............................................. F02C 3/16
[52] U.S. Cl. .................................. 60/39.35; 60/39.75; 415/91
[58] Field of Search ........................ 415/91, 77, 78, 79, 415/177, 39.161, 39.162, 39.34; 60/39.35, 39.36, 39.75

[56] References Cited

U.S. PATENT DOCUMENTS

| | | | |
|---|---|---|---|
| 1,162,839 | 12/1915 | Wohlenberg | 415/91 |
| 2,404,767 | 7/1946 | Heppner | 60/39.35 |
| 2,428,330 | 9/1947 | Heppner | 415/79 |
| 2,639,583 | 5/1953 | Steele | 60/39.162 |
| 2,702,985 | 3/1955 | Howell | 415/79 |
| 2,704,645 | 3/1955 | Colvin | 60/39.36 X |
| 2,712,412 | 7/1955 | West | 415/213 |
| 3,143,972 | 8/1964 | Smith et al. | 415/91 |
| 3,186,166 | 6/1965 | Grieb | 415/79 |
| 4,083,180 | 4/1978 | Thompson et al. | 415/177 X |
| 4,105,016 | 8/1978 | Donovan, Jr. | 415/DIG. 4 |

FOREIGN PATENT DOCUMENTS

| | | |
|---|---|---|
| 849328 | 9/1952 | Fed. Rep. of Germany . |
| 962301 | 10/1956 | Fed. Rep. of Germany . |
| 339962 | 6/1904 | France ................................. 415/91 |
| 1226960 | 8/1960 | France . |

Primary Examiner—Louis J. Casaregola
Attorney, Agent, or Firm—James E. Nilles

[57] ABSTRACT

The invention relates to a flow energy conversion machine having a substantially circular flow-through cross-section and comprising stationary guide blades disposed in at least one plane perpendicular to the flow direction, and rotor blades disposed in at least one plane parallel to the plane of said guide blades and cooperating with said guide blades, said guide blades being connected to a stationary part of said machine while said rotor blades are secured to a part mounted for rotation about an axis extending substantially parallel to the flow direction. In order to achieve a simple, reliable and cost-effective construction of the machine and its blades, the invention provides that the guide blades are secured to a stationary shaft located at a central position in the flow path, and that the rotor blades are secured to a rotor mounted for rotation about the centrally located shaft.

4 Claims, 4 Drawing Figures

FLOW ENERGY CONVERSION MACHINE

This application is a continuation, of application Ser. No. 757,734, filed July 22, 1985 (abandoned).

The present invention relates to a flow energy conversion machine having a substantially circular flow-through cross-section and comprising stationary guide blades disposed in at least one plane perpendicular to the flow direction, and rotor blades disposed in at least one plane parallel to the plane of said guide blades and cooperating with said guide blades, said guide blades being connected to a stationary part of said machine while said rotor blades are secured to a part mounted for rotation about an axis parallel to the flow direction.

Known flow energy conversion machines of the type defined above comprise a stationary outer housing with a plurality of guide blades extending radially inwards therefrom. Any number of such guide blades are disposed in a plane extending perpendicular to a flow direction determined by the stationary outer housing. Usually there are several such guide blade containing planes at axially spaced positions. Disposed at a central position of the flow-through cross-section defined by the stationary housing is a rotor comprising a substantially shaft-like member with a plurality of rotor blades extending radially outwards therefrom, any number of rotor blades being again disposed in a plane extending parallel to the guide blade containing planes and thus perpendicular to the axis of rotation of the rotor. A gas flow passing through the flow path of the machine is alternately subjected to the action of the guide blades and the rotor blades, whereby to achieve the typical effect of a flow energy conversion machine. Due to the high-speed rotation of the rotor of a machine of this type, the rotor blades are subjected to the action of excessive centrifugal forces, resulting in considerable tensional stresses acting on the rotor blades. For this reason the rotor blades have to be made of a material having high tensile strength, resulting in very high production costs. The selection and processing of such high tensile strength materials, for instance high tensile steels, determines the maximum speed of a rotor of this type and/or the maximum size of flow energy conversion machines of this type in view of the circumferential speed at the outer ends of the rotor blades. In addition, the connection of the rotor blades to the main rotor body has to be capable of withstanding the tensile stresses and of transmitting them to the main rotor body. To this purpose the rotor blades are formed with a blade foot portion which is usually lockingly engaged with a correspondingly shaped seat formed on the main rotor body. The formation of the blade foot portion involves rather expensive processing operations, since the blade foot portion has to ensure not only a reliable anchoring of the rotor blade in view of the occurring tensile stresses, but has also to be manufactured to very close tolerances so as to preclude any movement of the rotor blades relative to the main rotor body. Furthermore the rotor blades of such known prior art flow energy conversion machines have to be capable of withstanding the high temperatures occurring in operation of the machine, and the considerable temperature variations between the inoperative temperature and operating temperatures. These requirements likewise contribute to the very high manufacturing costs for a machine of this type, in view of the indispensable safe anchoring of the rotor blades and the high tensile stresses to be absorbed.

It is an object of the present invention to provide a flow energy conversion machine of the type defined above and of a construction permitting the rotor blades and the rotor to be manufactured in a simple cost-effective manner while ensuring safe and reliable operation of the machine.

In order to attain this object, the invention provides that the guide blades are secured to a stationary shaft located at a central position in the flow path, and the rotor blades are secured to a rotor mounted for rotation about the central shaft.

The thus designed flow energy conversion machine according to the invention offers considerable advantages over prior art machines of this type. The arrangement of the rotor blades on a rotor mounted for rotation about a shaft located at a substantially central position in the flow path results in the rotor blades being subjected at least mainly to compressive forces resulting from the centrifugal force on rotation of the rotor. The transmission of compressive forces is not dependent, however, on the employ of high tensile strength alloys, as the compression strength of most alloys is substantially greater than their tensile strength. This results in considerably lower costs for the rotor blades, since the production and processing of such materials which are only to be subjected to compressive stresses is much less expensive. Moreover the construction of the blade foot portions of the rotor blades may be considerably simplified, since the foot portion has to transmit essentially only thrust forces to the rotor. In combination with the greatly simplified construction of the rotor blade itself, a thus simplified blade foot portion results in a considerable reduction of the manufacturing expenditure and the costs arising therefrom. A further advantage of a flow energy conversion machine constructed in this manner results from the fact that the rotor blades have substantially free inner ends and are retained in their position by the centrifugal force, so that the necessary provisions for dampening movements of the blade ends may be reduced to a minimum. The mounting of the guide blades on a stationary shaft located at a central position in the flow path, and the manufacture of these guide blades likewise involve considerably reduced expenditure, since the guide vanes can be mounted on the outer periphery of the central shaft in a simple manner, whereby the mounting and adjustment operations are greatly simplified and require less expensive equipment.

In an advantageous embodiment of the invention, the central shaft of the flow energy conversion machine may be of tubular configuration. In this manner it is possible to increase the overall strength of the machine while reducing its weight. Further in an advantageous embodiment of the invention, fuel lines and/or electric conductors may be disposed within the central tubular shaft of the machine. The arrangement of such lines and conductors within the stationary central shaft ensure their safeguarding and protection from external interference and damage. An additional result is a reduction of the overall volume of the machine, since in prior art machines of this type any such lines and conductors have to be mounted on the outer periphery of the machine.

In a preferred embodiment of the above discussed construction, the central shaft may be adapted to be cooled from the inside. In this manner it is possible to exert a direct influence on the temperatures prevailing within the flow energy conversion machine, and in particular to cool the guide blades in a simple and effective manner.

In a particularly advantageous embodiment of the invention, the rotor of the flow energy conversion machine may be mounted for rotation about the central shaft by means of at least one bearing disposed at the radial inner ends of respective rotor blades. This type of mounting of the rotor makes use of the structurally determined strength of the rotor blades. In addition, this type of mounting eliminates the necessity to provide additional structural members in the flow path which might impair the flow-through properties of the machine.

In another advantaeous embodiment of the invention, the rotor may be mounted for rotation on the central shaft by means of radial struts disposed in the flow path. These struts may have one of their ends secured to the rotor or to the central shaft while the respective other ends carry a bearing. In this manner the rotor may be mounted for rotation about the central shaft without regard to the construction and strength of the rotor blades or the guide blades, thus permitting the dimensions of the blades to be selected as dictated by other considerations.

In a particularly preferred embodiment of the invention, the flow energy conversion machine is a jet engine having an axial compressor succeeded by a combustion chamber and an axial turbine. A jet engine of this type, which is preferably employed for powering aircraft, has the particular merits of compact construction, low manufacturing costs and excellent reliability in operation. In connection with the above noted advantages, it is to be noted that the rotor has a very large outer surface area enabling the rotor and the rotor blades connected thereto to be cooled in a particularly effective manner. Under certain conditions the large outer surface area may result in a heat dissipation of a magnitude rendering any additional cooling means dispensable. Furthermore, the anchoring or mounting of a jet engine of this type, which may be termed "jet engine with peripheral rotor", is considerably simplified, as the stationary central shaft may be employed for this purpose, resulting in a further reduction of the total weight of the jet engine.

In an advantageous embodiment of the invention in the form of a jet engine, the combustion chamber may be secured to the central shaft and thermally insulated therefrom by means of a heat shield. This construction results in a particularly simple form of the combustion chamber and ensures simple and reliable mounting thereof. In addition, the thermal insulation from the central shaft by means of a heat shield can be accomplished by the simplest means and at minimum cost. The heat shield may for instance consist of a commercially available insulating material formed to a tubular shape. Because of the reduced cross-sectional dimensions of the stationary central shaft, only a small amount of such insulating material is required, whereby the total weight of the jet engine may be further reduced.

In another advantageous embodiment of the invention the flow energy conversion machine may be equipped with a radial compressor and/or a radial turbine. A flow energy conversion machine of this construction is usually designed for stationary employ, for instance in an electric power plant, and is of a particularly cost-effective construction which in combination with the advantages noted above renders it particularly economical. The complex configuration of the guide blades and rotor vanes required in a radial compressor, or radial turbine, respectively, is simplified to a particularly considerable degree by the fact that these blades do not require any particular foot portion, or any particular anchoring, since in particular the rotor blades are only subjected to compressive forces. The principle underlying the flow energy conversion machine according to the invention enables such stationary machines to be manufactured particularly economically while imparting to such a machine a high efficiency thanks to its low weight and simple mechanical construction. This high degree of efficiency is also manifest in a positive influence on the combustion process in operation of the machine whereby there is achieved a simple and economical manner a reduced pollutant emission as demanded in context with current environment protection endeavours.

In the case of a flow energy conversion machine equipped with a radial compressor and/or a radial turbine, an advantageous embodiment of the invention provides that the substantially radially extending rotor blades are formed or mounted on a radial rotor wheel. This construction is conducive to a further simplification of the shape of the rotor blades and results in a considerable reduction of the demands to be imposed on the blade material. The radial rotor wheel may be formed as a planar annulus, as it is likewise subjected essentially to compressive loads only.

A flow energy conversion machine according to the invention equipped with a radial compressor and/or a radial turbine is advantageously designed in such a manner that the guide blades are formed or supported on a radial stator wheel in the shape of a logarithmic spiral having its inner end aligned radially to the central shaft, and its outer end tangential to the rotor. The distribution of forces in a guide blade of this type, which is secured to the central shaft by means of a radial stator wheel in the form of a planar annulus, permits a particularly simple construction of the guide blades to be provided in this case alos. This is particularly due to the fact that the inner ends of the guide blades are radially aligned with respect to the central shaft, while their outer ends extend tangential with respect to the rotor. This shape, which corresponds to a logarithmic spiral, may be achieved in a particularly simple manner, for instance by a casting process, and ensures a very high degree of efficiency of the radial compressor or radial turbine, respectively.

Figure 2:
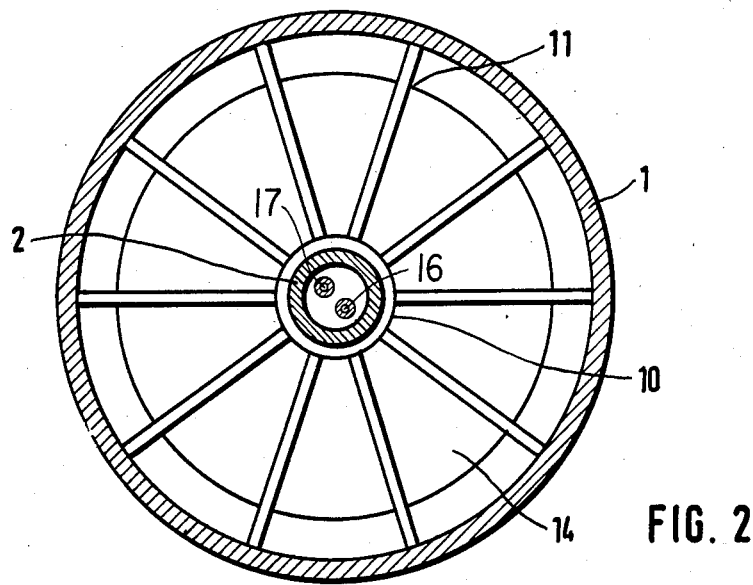
Figure 3:
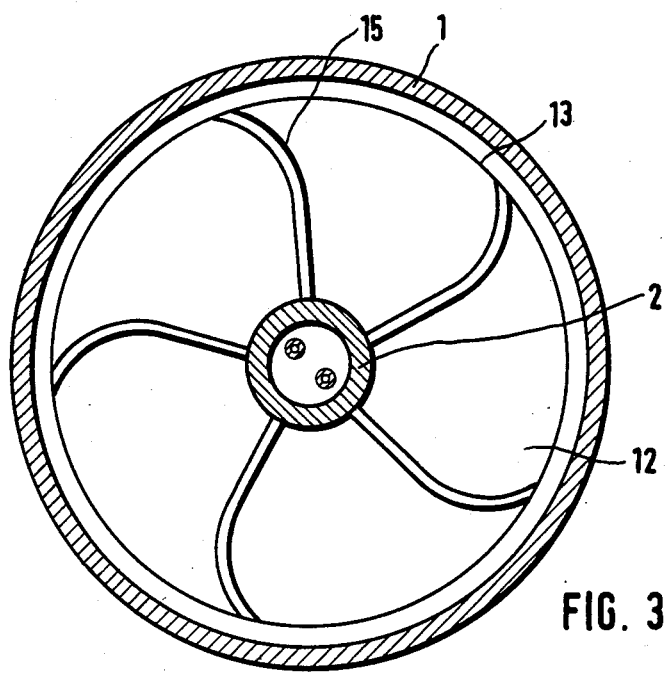
Figure 4:
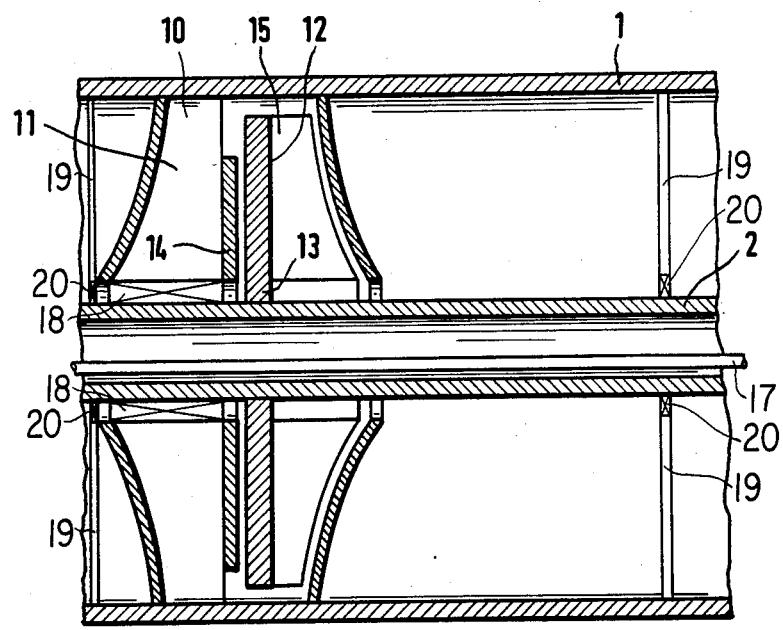

Embodiments of the flow energy conversion machine according to the invention shall now be described by way of example with reference to the accompanying drawings, wherein:

FIG. 1 shows a diagrammatical longitudinal sectional view of a flow energy conversion machine according to the invention in the form of a jet engine, FIG. 2 shows a cross-sectional view perpendicular to the central shaft and showing a radial rotor wheel with its rotor blades, FIG. 3 shows a cross-sectional view perpendicular to the central shaft and showing a radial guide wheel with its guide blades, and FIG. 4 shows a diagrammatic longitudinal sectional view of a part of a flow energy conversion machine according to the invention equipped with a radial compressor and/or a radial turbine.

Shown in FIG. 1 is a longitudinal cross-sectional view of a flow energy conversion machine according to the invention in the form of a jet engine having, in the direction of flow, an axial compressor, a combustion chamber, and an axial turbine. The jet engine has a stationary central shaft 2 which may be secured in a not shown manner to an aircraft by means of a suitable mounting support. Central shaft 2 is of tubular configuration. The hollow interior of the shaft may be employed for cooling of the central shaft or for the accommodation of fuel lines 16 and/or electric conductors 17. On its outer periphery central shaft 2 carries guide blades 4 and 6. The guide blades 4 of the lefthand portion in the drawing, which acts as an axial compressor, are arranged in two planes extending perpendicular to the central shaft at a given spacing. Guide blades 4 may be secured to central shaft 2 by mechanical means or by welding or in any other suitable manner. At a longitudinally intermediate portion the jet engine shown in FIG. 1 has a combustion chamber 5 likewise secured to central shaft 2. Combustion chamber 5 itself may be of conventional construction. In the region of combustion chamber 5, i.e. of the highly compressed hot gasses 9 generated therein, central shaft 2 is surrounded by a heat shield 8 of substantially tubular configuration. Located in two planes extending perpendicular to central shaft 2 downstream of combustion chamber 5 are further guide blades 6 and 8A, respectively, which are secured to the outer periphery of central shaft 2 in the same manner for instance as guide blades 4. Guide blades 6 and 8A are part of an axial turbine, guide blades 8A being designed so as to direct the gas flow exiting from the jet engine at outlet 9A in a direction substantially parallel to central shaft 2. Central shaft 2 is surrounded by a substantially tubular rotor 1 mounted for rotation about central shaft 2 and coaxial therewith. Rotor 1 is provided with rotor blades 3, 7 secured to the inner wall surface thereof. Rotor blades 3 and 7 are disposed in respective planes extending perpendicular to central shaft 2. The part of the jet engine acting as the axial compressor is provided with rotor blades 3 in two planes spaced from one another in the axial direction. During rotation of rotor 1 the rotor blades 3 are substantially subjected to compressive forces only, and therefore they may be secured to rotor 1 by simple mechanical connections or by welding. The planes in which rotor blades 3 are arranged alternate with the planes containing guide blades 4 so as to form a twostage compressor. Rotor blades 7 are disposed in a single plane located between the planes containing guide blades 6 and 8A, respectively, so as to form an axial turbine. The rotatable mounting of rotor 1 may be provided as bearing 18 at the inner ends of rotor blades 3 and 7 in cooperation with central shaft. It is also envisaged, however, to provide additional radially extending struts 19 secured either to central shaft 2 or to rotor 1 and carrying suitable bearing means 20 at their respective free ends.

FIG. 2 shows a cross-sectional front view of a radial rotor 10 of a flow energy conversion machine according to the invention. Radial rotor wheel 10 is secured to rotor 1 in a manner not shown, for coaxial rotation about central shaft 2. Radial rotor wheel 10 comprises a circular disk 14 carrying a number of radially extending rotor blades 11. Radial rotor wheel 10 cooperates with a radial guide wheel to be described with reference to FIG. 3 to form a radial compressor or a radial turbine. The radially extending configuration of rotor vanes 11 results in the blades being subjected only to compressive forces on rotation of rotor 1. As already explained above, this results in a particularly simple construction of rotor blades 11 and their connection to rotor 1. Rotor blades 11, or radial rotor wheel 10, respectively, may thus be secured to rotor 1 by a simple mechanical connection or by welding.

Shown in FIG. 3 in a diagrammatical representation is an axial view in the upstream direction of a radial guide wheel 12 having radial guide blades 15. Radial guide wheel 12 is located in the interior space of rotor 1 and secured to central shaft 2 by means of an annular disk 13. Disk 13 is of substantially planar configuration and may be secured to central shaft 2 by a mechanical connection, for instance by means of a keying arrangement. The radial guide blade 15 of radial guide wheel 12 are supported by annular disk 13 and have inner ends extending in radial directions with respect to central shaft 2. For the rest each guide blade 15 is formed as a logarithmic spiral with its outer end extending tangentially with respect to the periphery of guide wheel 12. As a result of this configuration of radial guide blades 15, the gas flow has a minimum rotational component on reaching the adjacent downstream compressor stage or the combustion chamber.

FIG. 4 shows in diagrammatical representation a longitudinal sectional view of a portion of an embodiment of a flow energy conversion machine according to the invention forming a part of a radial compressor or of a radial turbine. Central shaft 2 is mounted in any suitable manner and carries an annular disk 13 of a radial guide wheel 12 provided with radial guide blades 15. The design of radial guide blades 15 and radial guide wheel 12 has already been described in detail with reference to FIG. 3. Secured to rotor 1 surrounding central shaft 2 upstream of radial guide wheel 12 is a radial rotor wheel 10 comprising radial rotor blades 11 carried on an annular disk 14 as already described in detail with reference to FIG. 2. The exact configuration of radial rotor wheel 10 and radial guide wheel 12 in the axial direction as well as the spacing therebetween is determined by the pressure relationships and the thermodynamical properties of the gas flow. The representation of FIG. 4 merely shows a diagrammatic view of an embodiment which may be applied both to a radial compressor and to a radial turbine. It is also possible to provide a flow energy conversion machine according to the invention with several radial compressor stages or radial turbine stages of this general construction.

In the embodiments depicted in the drawings, the mounting of central shaft 2 is not shown in detail, as it may be adapted to the demands of any specific application. Not shown, either, is an outer housing surrounding rotor 1. In the case of the flow energy conversion machine being employed as a jet engine it is of course accommodated in a corresponding outer fairing of the aircraft. For use of the flow energy conversion machine according to the invention for stationary operation, the provision of a housing surrounding rotor 1 would not be required by functional considerations, but merely recommended for safety reasons. Within the scope of the invention it is further possible to provide a flow energy conversion machine according to the invention with a combination of axially and radially acting compressor and/or turbine stages. Finally the mounting of rotor 1 for rotation relative to central shaft 2 may also be varied in any suitable manner.

I claim:

1. A flow engine through which gases flow in one direction from an inlet at one end of the engine to an outlet at the other end thereof, said engine having a substantially circular cross-section transverse to said one direction and having stationary guide blades arranged in said cross-section in at least one plane which is normal to said one direction and rotor blades which are rotatably arranged in at least one plane parallel to the plane of said stationary guide blades, said engine being characterized by:

A. a tubular shaft member which
  (1) is coaxial to said cross-section,
  (2) extends in said one direction through at least the distance between said inlet and said outlet, and
  (3) has a diameter which is uniform along substantially its entire length;
B. said stationary guide blades being fixed to the exterior of said tubular shaft member;
C. a cylindrical rotor member disposed in relatively rotatable coaxially surrounding relationship to said tubular shaft member to cooperate therewith in defining an annular passage between said members, the inside diameter of said rotor member being
  (1) uniform along substantially the entire length thereof and
  (2) sufficiently larger than the outside diameter of said tubular shaft member so that the radial distance across said annular passage is greater than the outside diameter of said shaft member;
D. said rotor blades being fixed to said cylindrical rotor member at the interior thereof; and
E. a plurality of struts extending radially across said passage to maintain said members in said relationship, each said strut having a pair of opposite ends and being fixed at one of its ends to one of said members and having at its other end a bearing that connects it with the other of said members and provides for rotation of the cylindrical rotor member relative to the tubular shaft member.

2. A flow energy conversion machine according to claim 1, further characterized in that fuel lines are provided within said tubular shaft member.

3. A flow energy conversion machine according to claim 1 characterized in that said tubular shaft member is adapted to be cooled from the inside.

4. The flow engine of claim 1, further characterized by at least one electrical conductor within said tubular shaft.

* * * * *